United States Patent Office 3,277,036
Patented Oct. 4, 1966

3,277,036
CROSSLINKED COPOLYMERS OF ETHYLENE AND DERIVATIVES OF BICYCLO[2.2.1]HEPT-2-ENE
Clyde J. Whitworth, Jr., and Nathan L. Zutty, Charleston, W. Va., assignors to Union Carbide Corporation, a corporation of New York
No Drawing. Filed Sept. 10, 1962, Ser. No. 222,700
56 Claims. (Cl. 260—23)

This invention relates to novel crosslinked polymeric compositions. More particularly, this invention relates to crosslinked polymers containing ethylene.

The crosslinked polymeric compositions of this invention are crosslinked copolymers of ethylene and a substituted bicyclo[2.2.1]hept-2-ene of the formula:

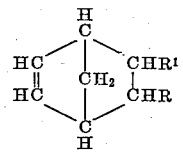

wherein R and $R^1$ are as hereinafter defined, which have been crosslinked by reaction with a polyfunctional crosslinking agent. These crosslinked compositions are produced by admixing the ethylene/substituted bicyclo[2.2.1]hept-2-ene copolymer and the crosslinking agent to form a heat-curable blend, and thereafter heating the blend at elevated temperatures to effect crosslinking.

The heat-curable blend is produced by any method known to those skilled in the art, such as by mechanical blending, either by milling the curing agent into the copolymer or by tumbling the curing agent and powdered copolymer together until an intimate mixture is obtained, or by solution procedures whereby the copolymer and the curing agent are co-dissolved in an appropriate solvent and the solvent thereafter evaporated.

The curing or crosslinking of the blend is effected by heating the blend at temperatures sufficient to initiate the crosslinking reaction, but below temperatures sufficient to cause the copolymer to decompose. In general, temperatures in the range of from about room temperature to about 300° C. have been found suitable, with temperatures of from about 100° C. to about 200° C. preferred. The cure time can vary from only a few minutes to several hours, depending upon the copolymer and the crosslinking agent employed, as well as upon the properties desired in the cured composition. In general, longer curing times permit a greater degree of crosslinking and a more brittle resin results. Normally, cure times of from 5 minutes to about 2 hours are employed, with periods of from 15 minutes to 45 minutes being preferred.

The copolymers which are employed to form the crosslinked compositions of this invention are the newly discovered copolymers of ethylene and a substituted bicyclo[2.2.1]hept-2-ene of the formula:

(A)

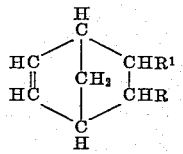

wherein R, when taken alone, is a hydrogen atom or an $R^1$ radical; $R^1$, when taken alone, is a —$C_nH_{2n}Z$ radical; $n$ is an integer having a value of from 0 to about 5; Z is a hydroxyl radical, a carboxyl radical, a carbonyl chloride radical, an isocyanato radical, a chloroformate radical, an $$-\left(OC_mH_{2m}\right)_d \overset{O}{\underset{}{\diagup\!\!\!\diagdown}} CHCH_2$$

radical, or an —$NHR^2$ radical; $m$ is an integer having a value of from 1 to about 5; $d$ is an integer having a value of from 0 to 1; $R^2$ is a hydrogen atom or an alkyl radical having from 1 to about 5 carbon atoms; and R and $R^1$, when taken together, form a divalent dicarboxylic anhydride radical.

The substituted bicyclo[2.2.1]hept-2-enes can be further represented by the formulae:

(I) 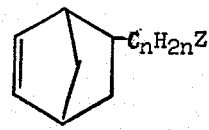

(II) 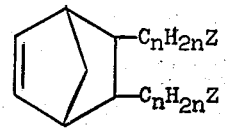

(III) 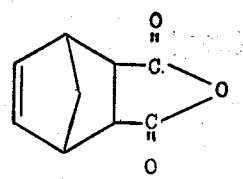

wherein $n$ and Z are as previously defined.

The 5-substituted bicyclo[2.2.1]hept-2-enes represented by Formula I can be further represented by the formulae:

(I-A) 

(I-B) 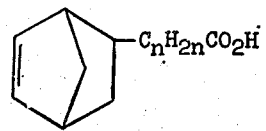

(I-C) 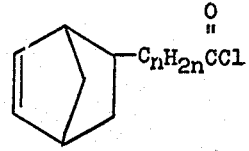

(I-D) 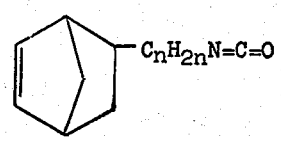

(I-E) 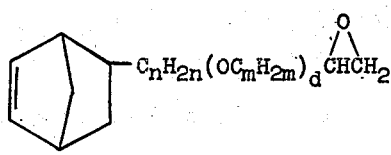

(I-F) 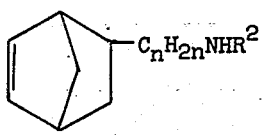

(I-G) 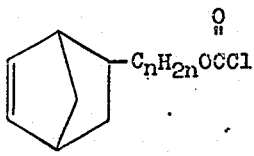

wherein $n$, $m$, $d$ and $R^2$ are as previously defined.

Similarly, the 5,6-disubstituted bicyclo[2.2.1]hept-2-enes represented by Formula II) can be further represented by the formulae:

(II-A) 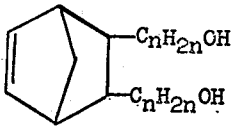

(II-B) 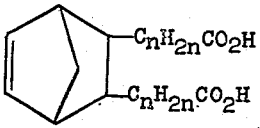

(II-C) 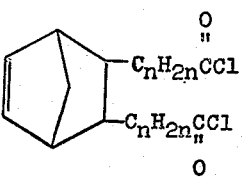

(II-D) 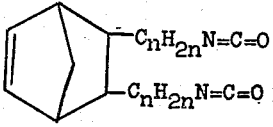

(II-E) 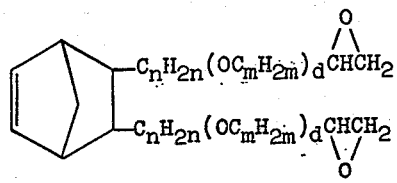

(II-F) 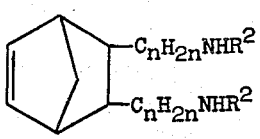

(II-G) 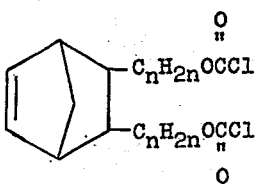

wherein $n$, $m$, $d$, and $R^2$ are as previously defined.

As examples of the substituted bicyclo[2.2.1]hept-2-enes which are polymerized with ethylene and are represented by the above formulae one can mention 5-hydroxybicyclo[2.2.1]hept-2-ene,
5-(hydroxymethyl)bicyclo[2.2.1]hept-2-ene,
5-(hydroxypentyl)bicyclo[2.2.1]hept-2-ene,
5-carboxybicyclo[2.2.1]hept-2-ene,
5-(carboxymethyl)bicyclo[2.2.1]hept-2-ene,
5-(carboxypentyl)bicyclo[2.2.1]hept-2-ene,
bicyclo[2.2.1]hept-2-ene-5-ylacetyl chloride,
bicyclo[2.2.1]hept-2-ene-5-ylpentanoyl chloride,
5-isocyanatobicyclo[2.2.1]hept-2-ene,
5-(isocyanatopentyl)bicyclo[2.2.1]hept-2-ene,
5-(epoxyethyl)bicyclo[2.2.1]hept-2-ene,
5-(epoxyheptyl)bicyclo[2.2.1]hept-2-ene,
bicyclo[2.2.1]hept-2-ene-5-ylmethyl glycidyl ether,
5-aminobicyclo[2.2.1]hept-2-ene,
5-(aminopentyl)bicyclo[2.2.1]hept-2-ene,
5-(methylamino)bicyclo[2.2.1]hept-2-ene,
5-(methylaminopentyl)bicyclo[2.2.1]hept-2-ene,
bicyclo[2.2.1]hept-2-ene-5-yl chloroformate,
bicyclo[2.2.1]hept-2-en-5-ylpentyl chloroformate,
5,6-dihydroxybicyclo[2.2.1]hept-2-ene,
5,6-bis(hydroxypentyl)bicyclo[2.2.1]hept-2-ene,
5,6-dicarboxycyclo[2.2.1]hept-2-ene,
5,6-bis(carboxypentyl)bicyclo[2.2.1]hept-2-ene,
bicyclo[2.2.1]hept-2-ene-5,6-diacetyl dichloride,
bicyclo[2.2.1]hept-2-ene-5,6-dipentanoyl dichloride,
5,6-diisocyanatobicyclo[2.2.1]hept-2-ene,
5,6-bis(isocyanatopentyl)bicyclo[2.2.1]hept-2-ene,
5,6-bis(epoxyethyl)bicyclo[2.2.1]hept-2-ene,
5,6-bis(epoxyheptyl)bicyclo[2.2.1]hept-2-ene,
bicyclo[2.2.1]hept-2-ene-5,6-dimethyl diglycidyl ether,
5,6-diaminobicyclo[2.2.1]hept-2-ene,
5,6-bis(aminopentyl)bicyclo[2.2.1]hept-2-ene,
5,6-bis(methylamino)bicyclo[2.2.1]hept-2-ene,
5,6-bis(methylaminopentyl)bicyclo[2.2.1]hept-2-ene,
bicyclo[2.2.1]hept-2-en-5,6-yl dichloroformate,
bicyclo[2.2.1]hept-2-ene-5,6-dipentyl dichloroformate,
bicyclo[2.2.1]hept-2-ene-5,6-dicarboxylic anhydride
and the like.

These substituted bicyclo[2.2.1]hept-2-enes generally are produced by the Diels-Alder addition of a substituted ethylene to cycopentadiene as described in United States Patent 2,340,908. However, the 5-hydroxybicyclo[2.2.1]hept-2-ene and the 5-aminobicyclo[2.2.1]hept-2-ene cannot be prepared in this manner. Rather, 5-hydroxybicyclo[2.2.1]hept-2-ene is produced by a Diels-Alder addition of vinyl acetate to cyclopenetadiene followed by hydrolysis of the bicyclo[2.2.1]hept-2-ene-5-yl acetate, and 5-aminobicyclo[2.2.1]hept-2-ene is produced by the Diels-Alder addition of vinyl chloride to cyclopentadiene and reaction of the resulting 5-chlorobicyclo[2.2.1]hept-2-ene with ammonia.

The copolymers of ethylene with the substituted bicyclo[2.2.1]hept-2-ene are produced by polymerization in contact with a free-radical catalyst according to known free-radical polymerization procedures. In general, the copolymerization is conducted at a temperature of from about 90° C. to about 350° C. and a pressure of from about 500 to about 10,000 atmospheres. The mole ratio of substituted bicyclo[2.2.1]hept-2-ene to ethylene in the reaction mixture can vary from about 0.1:100 to about 1:2, with from about 0.1:100 to about 0.1:10 being preferred.

By the term "free radical catalyst" is meant a catalyst which produces a free radical under the polymerization conditions employed. The free-radical catalysts are well known and include oxygen; hydrogen peroxide; alkanoyl and aroyl peroxides, such as peracetic acid, acetyl peroxide, perlauric acid, lauroyl peroxide, perbenzoic acid, penzoyl peroxide, acetyl benzoyl peroxide, and the like; alkyl peroxides, such as tert.-butyl hydroperoxide, di-tert.-butyl peroxide, bis($\alpha,\alpha$-dimethylbenzoyl) peroxide (dicumyl peroxide), and the like; alkali metal persulfates, perborates, and percarbonates; isopropylperoxydicarbonate; azo compounds, such as azo-bis-isobutyronitrile, dimethyl azodiisobutyrate, azo-bis-1-phenyl ethane, and the like; the alkali metal azodisulfonates; trialkylboron compounds, such as tri-n-butylboron and the like, in the presence of oxygen; etc. The free-radical catalysts are generally employed in amounts of from about 1 p.p.m. to about 10,000 p.p.m. or more, and preferably from about 1 to about 1000 p.p.m., based on the total weight of polymerizable momomers.

These copolymers produced as described above can contain from 0.1 to about 25 mole percent of the substituted bicyclo[2.2.1]hept-2-ene, with from about 0.5 to about 10 mole percent preferred. These copolymers range in melt index from about 0 to 10,000 decigrams per minute, as determined according to ASTM D1238–52T.

These copolymers, when produced by the free-radical polymerization procedure outlined above, are to be distinguished from those produced by processes employing coordination type polymerization catalysts. The latter processes proceed, at least in part, by way of ring scission of the bicyclo[2.2.1]hept-2-ene nucleus, and the substituted bicyclo[2.2.1]hept-2-ene compound enters the copolymer chain substantially in the form of recurring cyclopentanylvinylene units of the formula:

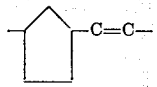

When free-radical catalysts are employed, however, no ring scission occurs. Instead, the bicyclo[2.2.1]hept-2-ene nucleus enters the polymer chain substantially in the form of a bicyclo unit of the formula

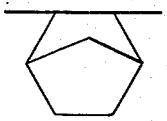

Thus, the copolymers which are crosslinked according to this invention are characterized by the presence of recurring —CH$_2$CH$_2$— units and recurring bicyclo[2.2.1]heptanylene units, whereas the copolymers produced with coordination catalysts are characterized by recurring —CH$_2$CH$_2$— units and recurring cyclopentaylvinylene units.

The crosslinked polymeric compositions of this invention are produced by admixing an ethylene/substituted bicyclo[2.2.1]hept-2-ene copolymer, wherein the substituted bicyclo[2.2.1]hept-2-ene is present substantially in the form of substituted bicyclo[2.2.1]heptanylene units, with a crosslinking amount of a crosslinking agent, as hereinafter defined, to form a curable blend and heating the blend at elevated temperatures to effect the crosslinking.

The crosslinking agents employed in producing the crosslinked polymeric compositions of this invention are polyfunctional materials whose functional groups react with the substituents on the polymerized substituted bicyclo [2.2.1]hept-2-ene and through which the crosslinking takes place. These functional groups may be present on the crosslinking agent when forming the blend or they may be formed in situ during the crosslinking itself.

Suitable crosslinking agents are organic polyfunctional monomeric or polymeric materials, including (a) simple polyfunctional materials such as organic polyepoxides; organic primary or secondary polyamines; organic polyisocyanates; organic polyhydroxides; organic polyphenols; organic polycarboxylic acids, their anhydrides, or their acid chlorides or salts; or polysulfonic acids or their acid chlorides or salts; (b) complex organic polyfunctional materials, i.e., compounds having two or more different functional groups; or (c) metal oxides wherein the metal is present in a valence state of at least two.

These crosslinking agents can be further classified according to the substituent on the bicyclo[2.2.1]hept-2-ene nucleus as follows:

(1) When Z in Formula A, above, is a hydroxyl group, suitable crosslinking agents are those polyfunctional organic compounds having two or more reactive sites in the form of an epoxy group, an isocyanato group, a carboxyl group, a carbonyl chloride group, a dicarboxylic acid anhydride group, a sulfo group (—SO$_3$H), or a sulfonyl chloride group;

(2) When Z in Formula A is a carboxyl group, suitable crosslinking agents are those polyfunctional organic compounds having two or more reactive sites in the form of an epoxy group, an aliphatic hydroxyl group, or an isocyanato group, or are metal oxides wherein the metal is present in a valence state of at least two;

(3) When R and R$_1$ in Formula A form a divalent dicarboxylic anhydride group, suitable crosslinking agents are those polyfunctional organic compounds having two or more reactive sites in the form of an epoxy group, an amino group (—NH$_2$), an imino group (—NH—), an aliphatic hydroxyl group, or a phenolic hydroxyl group, or are metal oxides wherein the metal is present in a valence state of at least two;

(4) When Z in Formula A is a carbonyl chloride group, suitable crosslinking agents are those polyfunctional organic compounds having one or more reactive sites in the form of an epoxy group, an amino group (—NH$_2$), and imino group (—NH—), an aliphatic hydroxyl group, or a phenolic hydroxyl group, or are metal oxides where in the metal is present in a valence state of at least two;

(5) When Z in Formula A is a chloroformate group, suitable crosslinking agents are those polyfunctional compounds containing two or more reactive sites in the form of an aliphatic hydroxyl group, a phenolic hydroxyl group, an amino group (—NH$_2$), or an imino group (—NH—);

(6) When Z in Formula A is an —NHR$_2$ group, suitable crosslinking agents are those polyfunctional organic compounds having two or more reactive sites in the form of a dicarboxylic acid anhydride group, a carbonyl chloride group, an isocyanato group, or an epoxy group;

7. When Z in Formula A is an iscyanato group, suitable crosslinking agents are those polyfunctional organic compounds having two or more reactive sites in the form of an aliphatic hydroxyl group, a carboxyl group a carbonyl chloride group, an amino group (—NH$_2$), or an imino group (—NH—);

(8) When Z in Formula A is an

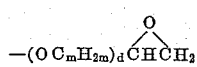

group, suitable crosslinking agents are those polyfunctional organic compounds having two or more reactive sites in the form of an aliphatic hydroxyl group, a carboxyl group, a discarboxylic acid anhydride group, an amino group (—NH$_2$), or an imino group (—NH—).

The epoxides which are useful as crosslinking agents according to this invention are vicinal mono- and polyepoxides. As examples of suitable monoepoxides one can mention ethylene oxide, 1,2-epoxypropane, 1,2-epoxybutane, 2,3-epoxybutane, 1,2-epoxycyclohexane, and the like. As examples of suitable polyepoxides one can mention epoxides of 3-cyclohexene carboxylic acid and alkyl-substituted 3-cyclohexenecarboxylic acid esters of polyols such as ethylene glycol, diethylene glycol, triethylene glycol, tetraethylene glycol, 1,2-propylene glycol, the octadecane diols, 1,1,1-trimethylolmethane, and the like, represented by the formula:

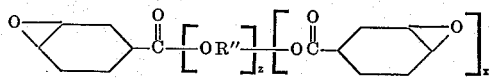

wherein R″ is a saturated hydrocarbon radical having from 2 to 20 carbon atoms; z is an integer having a value of from 1 to 5; and x is an integer having a value of 1 to 2; esters of 3,4-epoxycyclohexylmethanol and alkyl-substituted 3,4-epoxycyclohexylmethanol and 3,4-substituted 3,4-epoxycyclohexanecarboxylic acid; epoxides of esters of cyclohexenylmethylol and a polycarboxylic acid, such as oxalic acid, malonic acid, succinic acid, adipic acid, maleic acid citraconic acid, isocitraconic acid, fumaric acid, pimelic acid, terephthalic acid, azelaic acid, sebacic acid, itaconic acid, hexahydrophthalic acid, phthalic acid, glutaconic acid, hydromuconic acid, thapsic acid, and the like, which are represented by the formula:

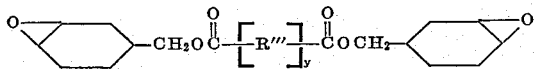

wherein R‴ is a divalent hydrocarbon radical of from 1 to 15 carbon atoms, and y is an integer having a value of 0 to 1; as well as butadiene dioxide, the diglycidyl ether of 2,2-bis(4′-hydroxyphenyl)propane, dicyclopentadiene dioxide, 4-vinylcyclohexane dioxide, bis(2,3-epoxycyclopentadienyl)ether, bis(3-oxatetracyclo[4.4.0.1$^{7,10}$0$^{2,4}$]undec-8-yl)ether, an ethylene/5 - (epoxyethyl) - bicyclo[2.2.1]hept - 2-ene copolymer, and the like.

As examples of organic polyisocyanates useful as crosslinking agents according to this invention one can mention 2,4-tolylenediisocyanate, biphenylene diisocyanate, hexamethylene diisocyanate, 4,4′-methylene di-o-tolyisocyanate, xylene diisocyanate, 1-methyl-2,4-cyclohexylenediisocyanate, bis(4-isocyanatophenyl)methane, 1,5-napthylenediisocyanate, tris(4-isocyanatophenyl)methane, 3,3′-dimethyl - 4,4′-biphenylene - diisocyanate, 2,2′,5,5′-tetramethyl - 4,4′-biphenylenediisocyanate, ethylenediisocyanate, trimethylenediisocyanate, benzene-1,3,5-triisocyanate, toluene - 2,4,6-triisocyanate, biphenyl-2,4,4′-triioscyanate and the like.

As examples of organic polycarboxylic acids which can be employed as crosslinking agents one can mention oxalic acid, malonic acid, succinic acid, glutaric acid, adipic acid, pimelic acid, suberic acid, azelaic acid, sebacic acid, brassylic acid thapsic acid, maleic acid, fumaric acid, glutaconic acid, alpha-hydromuconic acid, beta-hydromuconic acid, 1,1,5-pentanetricarboxylic acid, 1,2,4-hexanetricarboxylic acid, 2-propyl-1,2,4-pentanetricarboxylic acid, phthalic acid, isophthalic acid, terephthalic acid, hemimellitic acid, trimellitic acid, trimesic acid, 1,4-cyclohexanedicarboxylic acid, naphthalic acid, dinicotinic acid, 3,4-quinolinedicarboxylic acid, 3-carboxycinnamic acid and the like.

The acid chlorides of the above-related polycarboxylic acids can also be employed as crosslinking agents. As examples one can mention oxalyl dichloride, malonyl dichloride, adipyl dichloride, sebacyl dichloride, thapsyl dichloride, 1,1,5-pentanetricarboxylic acid trichloride, trimesyl trichloride and the like.

As examples of polycarboxylic acid anhydrides which can be employed as crosslinking agents one can mention phthalic anhydride, 1,2,3,4-tetrahydrophthalic anhydride, succinic anhydride, maleic anhydride, pyromellitic dianhydride, hexahydrophthalic anhydride, dichloromaleic anhydride, chlorendic anhydride, citraconic anhydride, bicyclo[2.2.1]hept-2-ene-5,6-dicarboxylic anhydride, 1,4,5, 8-naphthalenetetracarboxylic dianhydride, 1,2,3,4-cyclohexanetetracarboxylic dianhydride, methylbicyclo[2.2.1]hept-2-ene-5,6-dicarboxylic anhydride and the like.

As examples of organic polysulfonic acids and acid chlorides which can be employed as crosslinking agents, one can mention o-benzenedisulfonic acid, o-benzenedisulfonyl chloride, m-benzenedisulfonic acid, m-benzenedisulfonyl chloride, p-benzenedisulfonic acid, p-benzenedisulfonyl chloride, 1,5-naphthalenedisulfonic acid, 1,5-naphthalenedisulfonyl chloride and the like.

As examples of polyhydric alcohols which can be employed as crosslinking agents one can mention 1,3-butanediol,
1,4-butanediol,
2,3-butanediol,
N-butyldiethanolamine,
diethylene glycol,
2,2-diethyl-1,3-propanediol,
dipropylene glycol,
2-ethoxymethyl-2,4-dimethyl-1,5-pentanediol,
2-ethyl-2-butyl-1,3-propanediol,
N-ethyldiethanolamine,
2-ethyl-1,3-hexanediol,
2-ethyl-1,5-pentanediol,
2,4-heptanediol,
1,2,6-hexanetriol,
2,5-hexanediol,
N-isopropyldiisopropanolamine,
2-methoxymethyl-2,4-dimethyl-1,5-pentanediol,
alpha-methoxybenzyldiethanolamine,
methyldiethanolamine,
3-methyl-1,5-pentanediol,
2-methyl-2,4-pentanediol,
2-methyl-1,5-pentanediol,
2-methyl-1,3-pentanediol,
neopentylglycol,
6-methyluracil,
2-methyl-2-propyl-1,3-propanediol,
2,4-pentanediol,
1,5-pentanediol,
pentaethyleneglycol,
phenyldiethanolamine,
1,3-propanediol,
propylene glycol,
tetraethyleneglycol,
m-tolyldiethanolamine,
o-tolyldiethanolamine,
thiodiglycol,
triethanolamine,
triisopropanolamine,
triethyleneglycol,
ethylene glycol and the like.

As examples of polyfunctional amines which can be employed as crosslinking agents, one can mention triethylenetetramine, tetraethylenepentamine, propylenediamine, pentaethylenehexamine, dipropylenetriamine, dimethylenediamine, 1,3-diaminopropane, 3,3′-diaminodipropylamine, N,N-bis(3-aminopropyl)methylamine, trimethylenediamine and the like.

Polyhydric phenols which can be employed as crosslinking agents include catechol, resorcinol, hydroquinone, pyrogallol, phloroglucinol, 1,2,4-trihydroxybenzene, bisphenol, bisphenol A, 1,5-dihydroxynaphthalene, 2,2,5,5-tetrakis(4-hydroxyphenyl)hexane and the like.

In addition to the simple polyfunctional compounds set forth above, complex polyfunctional materials can be employed if desired. As examples of suitable complex polyfunctional compounds one can mention o-aminobenzoic acid, m-aminobenzoic acid, p-aminobenzoic acid, p-(chlorosulfonyl)benzoyl chloride, p-(chlorosulfonyl)benzoic acid, 3,5-disulfonylphthalic anhydride, diethanolamine, diisopropanol amine, N-hydroxyethylaminoethylethanolamine and the like.

In addition to the utilization of monomeric crosslinking agents such as those described above, it is within the scope of this invention that the crosslinking may be between polymeric materials having in the polymer chain a functional group which will react with the functional group of the ethylene/bicycloheptene derivative copolymer. For example, a copolymer wherein Z of Formula A is a hydroxyl radical can be blended with a copolymer having a pendant carboxylic anhydride group or a pendant carboxylic acid group and thereafter crosslinked according to the process of this invention.

In addition to the organic polyfunctional compounds described above, certain metal oxides can be employed as crosslinking agents for the carboxyl-, the carbonyl chloride-, and the anhydride-containing copolymers. Suitable oxides are those wherein the metal is present in a valence state of at least two. As examples of these polyvalent metal oxides one can mention zinc oxide, cadmium oxide, cupric oxide, calcium oxide, magnesium oxide, titanium oxide, aluminum oxide, barium oxide, strontium oxide, cobalt oxide, tin oxide, iron oxide, lead oxide, and the like.

The crosslinking agent is employed in an amount varying from about 0.1 or less to about 10 or more chemical equivalents of crosslinking agent per chemical equivalent of copolymer, with from about 0.5 to about 2 chemical equivalents of crosslinking agent per equivalent of copolymer being preferred. By the term "chemical equivalent" as employed in the specification and claims is meant a single reactive or functional group. For example, a glycol contains two chemical equivalents of a hydroxyl group, and a dicarboxylic acid anhydride contains two chemical equivalents of a carboxyl group.

As stated above, the reactive functional groups may be present on the crosslinking agent when admixed with the ethylene/substituted bicyclo[2.2.1]hept-2-ene copolymer, or they may be formed in situ, as where an epoxide-substituted copolymer is admixed with a catalyst for opening the epoxide ring, whereby the epoxide ring is opened and a hydroxyl group is formed which, in turn, reacts with the functional group of the ethylene/substituted bicyclo[2.2.1]hept-2-ene copolymer.

As examples of suitable catalysts for opening the epoxide ring one can mention primary amines and secondary amines such as those previously cited as useful as reactive cross-linking agents; tertiary amines, such as triethylamine benzyldimethylamine, alpha-methylbenzyldimethylamine, dimethylaminomethylphenol, tris(dimethylaminomethyl)-phenol triacetate, tris(dimethylaminomethyl)phenol tribenzoate, tris(dimethylaminomethyl)phenol, tris(2-ethylhexoate) and the like; alcohols of the type referred to as reactive crosslinking agents and also monohydric alcohols and phenols such as heptanol, decanol, phenol, and the like; carboxylic acids, such as those referred to as reactive crosslinking agents, and monobasic acids, such as benzoic acid, lauric acid, and the like; heavy metal salts of organic fatty acids, such as stannous octoate, stannous dodecanoate, zirconium octoate, magnesium octoate, and the like; aluminum alkoxides; inorganic bases, such as sodium hydroxide, and the like; etc.

The catalysts for the opening of the epoxide ring are generally employed in an amount varying from 1 to about 20, and preferably from about 5 to about 15, weight percent, based upon the weight of the copolymer.

Normally the pressure at which the crosslinking is conducted is not critical. However, where thick sections of the copolymer are being crosslinked and side products are formed, such as water from the use of metal oxides with carboxyl-containing copolymers, or the reaction of hydroxyl groups with carboxylic acid groups, and the like; or hydrogen chloride, as from the reaction of an acid chloride group with a hydroxyl group; or carbon dioxide, as from the reaction of a carboxylic acid group with an isocyanato group, it is sometimes preferred to employ high pressures to minimize void spaces in the crosslinked polymeric composition due to these side products. In general, pressures of from about 1000 p.s.i. to about 30,000 p.s.i. or higher are employed.

In addition to crosslinking agents, various other additives, such as pigments, dyes, plasticizers and the like can be incorporated in the curable composition without interfering with the crosslinking.

The crosslinked compositions of this invention generally can be employed to form films, molded and extruded shaped articles, protective coatings and the like according to methods known to those skilled in the art.

A particularly useful composition of this invention is a copolymer of ethylene and bicyclo[2.2.1]hept-2-ene-5,6-dicarboxylic anhydride which has been crosslinked with a polyol, a polyamine or a hydroxylamine in a manner such that only one of the available carboxyl groups of each anhydride group has reacted with a hydroxyl or amino group. It has been unexpectedly and surprisingly found that the resulting composition is reversibly crosslinked; that is, the crosslinked composition can be heated to temperatures in excess of about 225° C. whereby the crosslinks are broken, and then cooled to a temperature less than about 225° C. whereby the crosslinks are reformed. It is believed that the reversibility of the crosslinking results from the formation of half-ester or half-amide crosslinks which on heating break to re-form the original anhydride and hydroxyl or amino groups. It is essential to the reversibility of the crosslinking that there is present in the curable blend no more than 1 chemical equivalent of hydroxyl or amino group on the crosslinking agent employed for each dicarboxylic anhydride group on the copolymer chain. If amounts of more than 1 are present the free carboxyl group of the half-ester or half-amide crosslink may react with the excess hydroxyl or amino groups, splitting out water and forming an irreversible crosslink. These reversibly crosslinked polymers have been found to be particularly useful in the production of plastic pipe, having physical properties similar to those possessed by polyethylene which has been crosslinked with peroxides, and having superior resistance to solvents and the like.

The preferred crosslinking agents for forming the reversibly crosslinked compositions are polyols, polyamines or hydroxylamines of the formula:

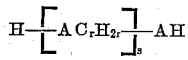

wherein A is either —O— or —NH—; $r$ is an integer having a value of from 2 to about 10; and $s$ is an integer having a value of from 1 to 10. As examples of suitable compounds of this formula one can mention ethylene glycol, propylene glycol, 1,4-butanediol, 1,3-butanediol, diethylene glycol, dipropylene glycol, diethanolamine, trimethylenediamine, diethylenetriamine, pentaethylene-hexa-amine, ethanolamine and the like. A particularly preferred composition is an admixture of the ethylene/bicyclo[2.2.1]hept-2-ene-5,6-dicarboxylic anhydride copolymer with a copolymer of ethylene and a substituted bicyclo[2.2.1]hept-2-ene of the formula:

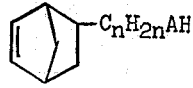

wherein $n$ is an integer having a value of from 0 to 5 and A is —O— or —NH—.

The ethylene/substituted bicycloheptene copolymers employed in producing the crosslinked polymers of this invention are disclosed and claimed in application Serial No. 328,354, filed December 5, 1963, by P. S. Starcher et al. as a continuation-in-part of application Serial No. 167,985, filed January 27, 1962, and now abandoned. The use of the reversibly crosslinked copolymers disclosed above in fabrication operations is claimed in application Serial No. 222,699, filed September 10, 1962, by C. J. Whitworth, Jr., et al.

In the examples which follow, the tests employed to determine the physical properties of the crosslinked and uncrosslinked polymers are:

Melt index _____ ASTM D1238–52T at 190° C. and 43.1 p.s.i.g.
Tensile strength _____ ASTM D882–56T.
Ultimate elongation _____ ASTM D882–56T.
Stiffness modulus _____ ASTM D638–60T.

The copolymers employed in the following examples were produced by the following general procedure. A stainless steel, stirred autoclave was charged with the selected substituted bicyclo[2.2.1]hept-2-ene monomer, di-tert.-butyl peroxide, and benzene. The autoclave was flushed with ethylene, sealed, and the ethylene pressure was raised to 2000 p.s.i.g. The autoclave was then heated to 160° C., the ethylene pressure was raised to 15,000 p.s.i.g. and the polymerization was conducted at these conditions for from 3 to 6 hours. The ethylene/substituted bicyclo[2.2.1]hept-2-ene copolymer was then filtered from the reaction mixture, washed with alcohol and dried.

EXAMPLE I

A 1.5-liter, stainless steel, stirrer-equipped autoclave was charged with 20 grams of 5-hydroxymethylbicyclo[2.2.1]hept-2-ene, 200 grams of benzene, 435 grams of water, and 2.0 milliliters of a 5 percent solution of di-tert.-butyl peroxide in benzene. The autoclave was sealed, flushed with ethylene, pressured to 2000 p.s.i. with ethylene, and heated to 160° C. The ethylene pressure was raised to 15,000 p.s.i.g. and the reaction mixture was maintained at 15,000 p.s.i.g. and 160° C. for 1.4 hours. After cooling, venting the autoclave, filtering from the reaction mixture, washing with methanol and drying, the ethylene/5-hydroxymethylbicyclo[2.2.1]hept-2-ene copolymer thus produced weighed 100 grams. Analysis of the copolymer showed that it contained 9.8 weight percent polymerized 5-hydroxymethylbicyclo[2.2.1]hept-2-ene in the form of bicyclic units of the formula:

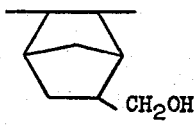

A portion of this copolymer was compounded with 3,3'-dimethyl-4,4'-biphenylene diisocyanate on a two-roll mill at a temperature of about 100° C. to produce a blend containing 97 weight percent of the copolymer and 3 percent of the 3,3'-dimethyl-4,4'-biphenylene diisocyanate. Plaques of this blend measuring 3 inches in diameter and 0.020 inch thick were compression molded at 850 p.s.i. and 100–120° C. The plaques were then heated at 175° C. for 15 minutes to crosslink the resin. The physical properties of the copolymer alone without added diisocyanate and of the blend before and after heating to achieve crosslinking are set forth in Table A.

Table A

| | Melt Index, dg./min. | Tensile Strength, p.s.i. | Ultimate Elongation, percent | Stiffness Modulus, p.s.i. |
|---|---|---|---|---|
| Copolymer | 1.46 | 2,100 | 690 | 17,600 |
| Copolymer/diisocyanate blend: | | | | |
| Molded | [1] 0 | 2,101 | 110 | 11,209 |
| Crosslinked | 0 | 2,739 | 325 | 19,085 |

[1] Crosslinked in melt indexer.

From Table A it is seen that the ethylene/5-hydroxymethylbicyclo[2.2.1]hept-2-ene copolymer is readily crosslinked by heating in admixture with a diisocyanate, as indicated by the lower melt index and higher tensile strength possessed by the cured polymer blend as compared to the melt index and tensile strength of the ethylene/5-hydroxymethylbicyclo[2.2.1]hept-2-ene copolymer alone.

In a similar manner, a crosslinked ethylene/5-hydroxybicyclo[2.2.1]hept-2-ene copolymer is produced by substituting an ethylene/5-hydroxybicyclo[2.2.1]hept-2-ene copolymer for the ethylene/5 - hydroxymethylbicyclo[2.2.1]hept-2-ene copolymer; and a crosslinked ethylene/5-(5'-hydroxypentyl)bicyclo[2.2.1]hept-2-ene copolymer is produced by substituting an ethylene/5-(5'-hydroxypentyl)bicyclo[2.2.1]hept-2-ene copolymer for the ethylene/5 - hydroxymethylbicyclo[2.2.1]hept-2-ene copolymer.

EXAMPLE II

Employing apparatus and procedures similar to those of Example I, a blend was compounded which contained 96 weight percent of the ethylene/5-hydroxymethylbicyclo[2.2.1]hept-2-ene copolymer produced as described in Example I and 4 weight percent 3,4-epoxy-6-methylcyclohexylmethyl 3,4-epoxy-6-methylcyclohexane carboxylate. Plaques of this blend, which were compression molded as described in Example I, were heated at 175° C. for 15 minutes to crosslink the resin. The physical properties of the unmodified copolymer and of the blend before and after heating to achieve crosslinking are set forth in Table B.

Table B

| | Tensile Strength, p.s.i. | Ultimate Elongation, percent | Stiffness Modulus, p.s.i. |
|---|---|---|---|
| Copolymer | 2,100 | 690 | 17,600 |
| Copolymer-diepoxide blend: | | | |
| Molded | 2,082 | 760 | 17,707 |
| Crosslinked | 2,230 | 830 | 20,057 |

In a similar manner, the ethylene/5-hydroxymethylbicyclo[2.2.1]hept-2-ene copolymer is crosslinked by substituting succinic acid, its anhydride, or acid chloride for 3,4-epoxy-6-methylcyclohexylmethyl 3,4-epoxy-6-methylcyclohexane carboxylate; or by substituting o-benzenedisulfonic acid or its acid chloride for 3,4-epoxy-6-methylcyclohexylmethyl 3,4-epoxy-6-methylcyclohexane carboxylate.

EXAMPLE III

An ethylene/5,6 - bis(hydroxymethyl)bicyclo[2.2.1]hept-2-ene copolymer containing 3.4 weight percent 5,6-(hydroxymethyl)bicyclo[2.2.1]hept-2-ene was produced according to the polymerization procedures described in Example I. Employing portions of this copolymer, two blends were compounded, which contained (a) 94.6 weight percent copolymer and 5.4 weight percent of the methyl adduct of endo-bis-bicyclo[2.2.1]hept-2-ene-5,6-dicarboxylic anhydride; and (b) 95.2 weight percent of the copolymer and 4.8 weight percent 1,2,3,4-tetrahydrophthalic anhydride. Plaques of these blends, which were compression molded as described in Example I, were heated at 175° C. for 15 minutes to crosslink the resin. The properties of the unmodified ethylene/5,6-bis(hydroxymethyl)bicyclo[2.2.1]hept-2-ene copolymer and of the blends before and after heating to achieve crosslinking are set forth in Table C.

Table C

| | Melt Index, dg./min. | Tensile Strength, p.s.i. | Ultimate Elongation, percent | Stiffness Modulus, p.s.i. |
|---|---|---|---|---|
| Copolymer | 18.12 | 1,479 | 450 | 20,830 |
| Blends with: | | | | |
| (a) Bicycloheptene anhydride: | | | | |
| Molded | 11.70 | 1,797 | 722 | 20,281 |
| Crosslinked | 6.62 | 2,285 | 795 | 20,840 |
| (b) Tetrahydrophthalic anhydride: | | | | |
| Molded | 11.16 | 1,400 | 130 | 22,170 |
| Crosslinked | 5.82 | 2,175 | 785 | 18,751 |

EXAMPLE IV

Employing polymerization procedures similar to those described in Example I, 20 grams of 5-isocyanatomethylbicyclo[2.2.1]hept-2-ene, 500 grams of benzene, and 2.0 milliliters of a 5 percent solution of di-tert.-butyl peroxide in benzene were heated at 160° C. and 15,000 p.s.i.g. for 2.25 hours to produce 51 grams of an ethylene/5-isocyanatomethylbicyclo[2.2.1]hept-2-ene copolymer. The copolymer contained 2.8 weight percent polymerized 5-isocyanatomethylbicyclo[2.2.1]hept-2-ene in the form of bicyclo units of the formula:

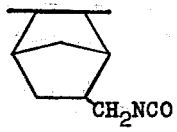

Employing a portion of this copolymer, a blend containing 94.5 weight percent of the copolymer and 5.5 weight percent 2,2 - bis(4 - hydroxyphenyl)propane (bisphenol A) was compounded according to the procedure described in Example I. Plaques of this blend, which were compression molded as described in Example I, were heated at 175° C. for periods of up to 30 minutes to crosslink the resin. The properties of the unmodified copolymer and of the blend before and after heating for the designated periods to achieve crosslinking are set forth in Table D.

Table D

|  | Crosslinking Time, Min. | Melt Index, dg./min. | Tensile Strength, p.s.i. | Ultimate Elongation, percent | Stiffness Modulus, p.s.i. |
|---|---|---|---|---|---|
| Copolymer | | 0.42 | 2,183 | 718 | 23,650 |
| Copolymer-Bisphenol Blend: | | | | | |
| Molded | | 0.24 | 2,360 | 825 | 19,176 |
| Crosslinked | 15 | 0.24 | 2,663 | 875 | 16,783 |
|  | 30 | 0.19 | 2,702 | 845 | 17,742 |

In a similar manner the ethylene/5-isocyanatomethylbicyclo[2.2.1]hept-2-ene copolymer is crosslinked by substituting succinic acid, its anhydride, or acid chloride for bisphenol A; or by substituting diethylene triamine for bisphenol A; and an ethylene/5,6-bis-isocyanatomethylbicyclo[2.2.1]hept-2-ene copolymer is crosslinked by substituting that copolymer for the ethylene/5-isocyanatomethylbicyclo[2.2.1]hept-2-ene copolymer; and an ethylene/5 - (5'-isocyanatopentyl)bicyclo[2.2.1]hept-2-ene copolymer is crosslinked by substituting that copolymer for the ethylene/5-isocyanatomethylbicyclo[2.2.1]hept-2-ene copolymer.

EXAMPLE V

Employing polymerization procedures similar to those described in Example I, an ethylene/5-epoxyethylbicyclo-[2.2.1]hept-2-ene copolymer was produced which contained 3.6 weight percent polymerized 5-epoxyethylbicyclo[2.2.1]hept-2-ene in the form of bicyclic units of the formula:

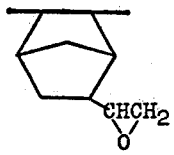

A portion of this copolymer was compounded by the procedure described in Example I to form a blend containing 95 weight percent of the copolymer and 5 weight percent 1,2,3,4-tetrahydrophthalic anhydride. Plaques of this blend, which were compression molded as described in Example I, were heated at 175° C. for periods of up to 30 minutes to crosslink the resin. The properties of the unmodified copolymer and of the blend before and after heating for the designated periods to achieve crosslinking are set forth in Table E.

Table E

|  | Crosslinking Time, Min. | Melt Index, dg./min. | Tensile Strength, p.s.i. | Ultimate Elongation, percent | Stiffness Modulus, p.s.i. |
|---|---|---|---|---|---|
| Copolymer | | 1.0 | 2,950 | 1,148 | 11,529 |
| Blend: | | | | | |
| Molded | | 0.273 | 2,419 | 903 | 14,892 |
| Crosslinked | 15 | 0 | 3,050 | 1,035 | 13,145 |
|  | 30 | 0 | 3,025 | 935 | 12,873 |

In a similar manner, the ethylene/5-epoxyethylbicyclo[2.2.1]hept-2-ene copolymer is crosslinked by substituting bisphenol A or triethylenetetramine for tetrahydrophthalic anhydride; and a copolymer of ethylene and bicyclo[2.2.1]hept-2-ene-5-methyl glycidyl ether is crosslinked by substituting said copolymer for the ethylene/5-epoxyethylbicyclo[2.2.1]hept-2-ene copolymer.

EXAMPLE VI

Employing apparatus and procedures similar to those described in Example I, a blend was compounded which contained 97 weight percent of the ethylene/5-epoxyethylbicyclo[2.2.1]hept-2-ene copolymer employed in Example V and 3 weight percent stannous octoate. Plaques of this blend, which were compression molded as described in Example I, were heated at 175° C. for periods of up to 30 minutes to crosslink the resin. The properties of the unmodified copolymer and of the blend before and after heating for the designated periods to achieve crosslinking are set forth in Table F.

Table F

|  | Crosslinking Time, Min. | Melt Index, dg./min. | Tensile Strength, p.s.i. | Ultimate Elongation, percent | Stiffness Modulus, p.s.i. |
|---|---|---|---|---|---|
| Copolymer | | 1.0 | 2,950 | 1,148 | 11,529 |
| Blend: | | | | | |
| Molded | | 0.455 | 2,648 | 975 | 14,391 |
| Crosslinked | 15 | 0.57 | 2,800 | 1,090 | 13,212 |
|  | 30 | 0.175 | 2,875 | 1,080 | 13,033 |

From Table F, it can be seen that the ethylene/5-epoxyethylbicyclo[2.2.1]hept-2-ene copolymer is readily crosslinked through the use of metal salts as indicated by the decrease in melt index of the cured blend from that of the copolymer alone.

In a similar manner, the ethylene/5-epoxyethylbicyclo[2.2.1]hept-2-ene copolymer is crosslinked by substituting triethylamine, decanol, lauric acid or sodium hydroxide for stannous octoate.

EXAMPLE VII

Employing polymerization procedures similar to those described in Example I, 20 grams of 5-carboxybicyclo[2.2.1]hept-2-ene, 475 grams of benzene and 1.0 gram of benzoyl peroxide were charged to the autoclave. Ethylene was admitted to a pressure of 15,000 p.s.i. and polymerization was carried out at 90° C. and 15,000 p.s.i. for 6 hours. The resulting ethylene/5-carboxybicyclo[2.2.1]hept-2-ene copolymer weighed 47 grams and contained 4.3 weight percent polymerized 5-carboxybicyclo[2.2.1]hept-2-ene in the form of bicyclic units of the formula:

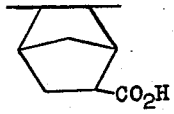

Employing a portion of this copolymer, a blend was compounded according to the procedure described in Example I which contained 94.7 weight percent of the copolymer, 5 weight percent 3,4-epoxy-6-methylcyclohexylmethyl 3,4-epoxy-6-methylcyclohexane carboxylate and 0.3 weight percent stannous octoate. Plaques of this blend, which were compression molded as described in Example I, were heated at 175° C. for periods of up to 1 hour to crosslink the resin. The properties of the copolymer and of the blend before and after heating for the designated periods to achieve crosslinking are set forth in Table G.

Table G

| | Crosslinking Time, Min. | Melt Index, dg./min. | Tensile Strength, p.s.i. | Ultimate Elongation, percent | Stiffness Modulus, p.s.i. |
|---|---|---|---|---|---|
| Copolymer | | 1,105 | 1,015 | 1.3 | 86,157 |
| Blend: | | | | | |
| Molded | | | 2,299 | 30 | 52,197 |
| Crosslinked | 15 | 2.25 | 2,044 | 67 | 54,955 |
| | 60 | 0.21 | 2,051 | 60 | 49,472 |

Employing similar procedures an ethylene/5-(5'-carboxypentyl)bicyclo[2.2.1]hept-2-ene copolymer is crosslinked by substituting said copolymer for the ethylene/5-carboxybicyclo[2.2.1]hept-2-ene copolymer; and an ethylene/5,6-dicarboxybicyclo[2.2.1]hept-2-ene copolymer is crosslinked by substituting said copolymer for the ethylene/5-carboxybicyclo[2.2.1]hept-2-ene copolymer.

EXAMPLE VIII

Employing polymerization procedures similar to those described in Example I, 20 grams of 5-carboxdicyclo[2.2.1]hept-2-ene, 400 grams of benzene, 435 grams of water and 2.0 milliliters of a 5 percent solution of di-tert.-butyl peroxide in benzene were charged to the autoclave and heated at 160° C. under an ethylene pressure of 15,000 p.s.i.g. for 1.75 hr. The resulting ethylene/5-carboxybicyclo[2.2.1]hept-2-ene copolymer weighed 81 grams and contained 9.2 weight percent polymerized 5-carboxybicyclo[2.2.1]hept-2-ene in the form of bicyclo units of the formula:

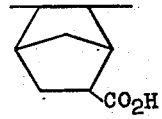

Employing a portion of this copolymer, a blend was compounded according to the procedure of Example I which contained 94.7 weight percent of the copolymer, 5 weight percent 3,4-epoxy-6-methylcyclohexylmethyl 3,4-epoxy-6-methylcyclohexane carboxylate and 0.3 weight percent stannous octoate. Plaques of this blend, which were compression molded according to the procedure of Example I, were heated at 175° C. for periods of up to 1 hour to crosslink the resin. The properties of the unmodified copolymer and of the blend before and after heating for the designated periods to achieve crosslinking are set forth in Table H.

Table H

| | Crosslinking Time, Min. | Melt Index, dg./min. | Tensile Strength, p.s.i. | Ultimate Elongation, percent | Stiffness Modulus, p.s.i. |
|---|---|---|---|---|---|
| Copolymer | | 119 | 1,586 | 100 | 31,048 |
| Blend: | | | | | |
| Molded | | 0 | 1,423 | 141 | 26,650 |
| Crosslinked | 15 | 0 | 2,593 | 601 | 23,017 |
| | 60 | 0 | 2,792 | 694 | 22,234 |

In a similar manner, the ethylene/5-carboxybicyclo[2.2.1]hept-2-ene copolymer is crosslinked by substituting 1,3-butanediol, 3,3'-dimethyl-4,4'-biphenylene diisocyanate or zinc oxide for 3,4-epoxy-6-methylcyclohexylmethyl 3,4-epoxy-6-methylcyclohexane carboxylate.

EXAMPLE IX

Employing polymerization procedures similar to those described in Example I, 20 grams of bicyclo[2.2.1]hept-2-ene-5,6-dicarboxylic anhydride, 200 grams of benzene, 435 grams of water, and 2.0 milliliters of a 5 percent solution of di-tert.-butyl peroxide in benzene were charged to the autoclave and heated at 160° C. under an ethylene atmosphere at 15,000 p.s.i.g. for 4 hours. The resulting ethylene/bicyclo[2.2.1]hept-2-ene-5,6-dicarboxylic anhydride copolymer weighed 64 grams and contained 2.8 weight percent polymerized bicyclo[2.2.1]hept-2-ene-5,6- dicarboxylic anhydride in the form of units of the formula:

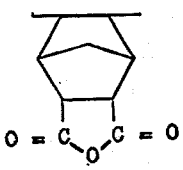

Employing a portion of this copolymer, a blend was compounded according to the procedure of Example I which contained 97 weight percent copolymer and 3 weight percent trimethylene diamine. Plaques of this blend, which were compression molded as described in Example I, were heated at 175° C. for 30 minutes to crosslink the resin. The properties of the unmodified copolymer and of the blend before and after heating to achieve crosslinking are set forth in Table I.

Table I

|  | Melt Index, dg./min. | Tensile Strength, p.s.i. | Ultimate Elongation, percent | Stiffness Modulus, p.s.i. |
| --- | --- | --- | --- | --- |
| Copolymer | 3.6 | 2,010 | 760 | 20,195 |
| Blend: |  |  |  |  |
| Molded | [1] 0 | 2,500 | 660 | 12,500 |
| Crosslinked | 0 | 3,052 | 910 | 12,630 |

[1] Crosslinked in melt indexer.

In a similar manner, the ethylene/bicyclo[2.2.1]hept-2-ene-5,6-dicarboxylic anhydride copolymer is crosslinked by substituting 3,4-epoxy-6-methylcyclohexylmethyl-3,4-epoxy-6-methylcyclohexane carboxylate, bisphenol A or zinc oxide for trimethylenediamine.

EXAMPLE X

Employing apparatus and procedures similar to those described in Example I, a blend was compounded which contained 50 weight percent of the ethylene/bicyclo[2.2.1]hept-2-ene-5,6-dicarboxylic anhydride copolymer produced as described in Example IX and 50 weight percent of the ethylene/5-hydroxymethylbicyclo[2.2.1]-hept-2-ene copolymer produced as described in Example I. Plaques of this blend, which were compression molded as described in Example I, were heated at 175° C. for periods of up to 30 minutes to crosslink the resin. The properties of the two copolymers and of the blend before and after heating for the designated periods to achieve crosslinking are set forth in Table J.

Table J

|  | Crosslinking Time, Min. | Melt Index, dg./min. | Tensile Strength, p.s.i. | Ultimate Elongation, percent | Stiffness Modulus, p.s.i. |
| --- | --- | --- | --- | --- | --- |
| Anhydride Copolymer |  | 3.6 | 2,010 | 760 | 20,195 |
| Hydroxymethyl Copolymer |  | 1.46 | 2,100 | 690 | 17,600 |
| Blend: |  |  |  |  |  |
| Molded |  |  | 2,299 | 855 | 15,039 |
| Crosslinked | 15 | 0.1 | 2,392 | 845 | 15,535 |
|  | 30 | 0 | 2,743 | 855 | 21,898 |

EXAMPLE XI

Employing polymerization procedures similar to those described in Example I, an ethylene/bicyclo[2.2.1]hept-2-ene-5,6-dicarboxylic anhydride cooplymer was produced which contained 6 weight percent polymerized bicyclo[2.2.1]-hept-2-ene-5,6-dicarboxylic anhydride in the form of units of the formula:

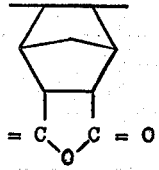

and an ethylene/5,6 - bis(hydroxymethyl)bicyclo[2.2.1]hept-2-ene copolymer was produced which contained 3,4 weight percent polymerized 5,6-bis(hydroxymethyl)bicyclo[2.2.1]hept-2-ene in the form of bicyclo units of the formula:

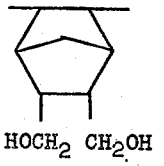

Employing procedures similar to those described in Example I, a blend containing 47.0 weight percent of the ethylene/bicyclo[2.2.1]hept - 2 - ene - 5,6 - dicarboxylic anhydride copolymer and 53.0 weight percent of the ethylene/5,6 - bis(hydroxymethyl)bicyclo[2.2.1]hept-2-ene copolymer was compounded at 85° C. Plaques of this blend, which were compression molded as described in Example I, were heated at 175° C. for periods of up to 30 minutes to crosslink the resin. The properties of the unmodified copolymers and of the blend before and after heating for the designated periods to achieve cross-linking are set forth in Table K.

Table K

|  | Crosslinking Time, Min. | Melt Index, dg./min. | Tensile Strength, p.s.i. | Ultimate Elongation, percent | Stiffness Modulus, p.s.i. |
| --- | --- | --- | --- | --- | --- |
| Anhydride polymer |  | 2.12 | 1,809 | 413 | 19,825 |
| Dihydroxymethyl polymer |  | 28.0 | 2,189 | 778 | 24,398 |
| Blend: |  |  |  |  |  |
| Molded |  | 0.025 | 2,460 | 880 | 16,502 |
| Crosslinked | 15 |  | 2,539 | 830 | 19,378 |
|  | 30 | 0 | 2,916 | 905 | 18,457 |

EXAMPLE XII

Employing apparatus and procedures similar to those described in Example I, a blend was compounded which contained 50 weight percent of the ethylene/bicyclo[2.2.1]hept-2-ene-5,6-dicarboxylic anhydride copolymer described in Example XI and 50 weight percent of the ethylene/5-epoxyethylbicyclo[2.2.1]hept-2-ene copolymer described Example V. Plaques of this blend, which were compression molded as described in Example I, were heated at 175° C. for periods of up to 30 minutes to crosslink the resin. The properties of each of the copolymers and of the blend before and after heating for the designated periods to achieve crosslinking are set forth in Table L.

Table L

|  | Cross-linking Time, Min. | Melt Index, dg./min. | Tensile Strength, p.s.i. | Ultimate Elongation, percent | Stiffness Modulus, p.s.i. |
| --- | --- | --- | --- | --- | --- |
| Anhydride Copolymer | | 2.12 | 1,809 | 413 | 19,825 |
| Epoxyethyl Copolymer | | 1.0 | 2,950 | 1,148 | 11,529 |
| Blend: | | | | | |
| Molded | | 0.2 | 2,418 | 690 | 17,511 |
| Crosslinked | 15 | 0.1 | 2,656 | 960 | 16,320 |
| | 30 | 0.1 | 2,763 | 1,015 | 16,800 |

EXAMPLE XIII

Employing polymerization procedures similar to those described in Example I, a copolymer of ethylene and bicyclo[2.2.1]hept - 2 - ene-5-carbonyl chloride is produced which is crosslinked by admixing with an anhydride such as tetrahydrophthalic anhydride, a polyamine such as trimethylenediamine, a polyphenol such as bisphenol A, or a metal oxide such as zinc oxide and heating at 175° C. for 30 minutes.

EXAMPLE XIV

Employing polymerization procedures similar to those described in Example I, a copolymer of ethylene and bicyclo[2.2.1]hept-2-ene-5-methylchlorformate is produced which is crosslinked by admixing with a polyphenol such as bisphenol A, or a polyamine such as trimethylenediamine and heating at 175° C. for 30 minutes.

EXAMPLE XV

Employing polymerization procedures similar to those described in Example I, an ethylene/5-aminomethylbicyclo[2.2.1]hept-2-ene copolymer is produced which is crosslinked by admixing with an anhydride such as tetrahydrophthalic anhydride, a polycarbonyl chloride such as the acid chloride of succinic acid, a polyisocyanate such as tolylene diisocyanate, or an epoxy compound such as 3,4 - epoxy-6-methylcyclohexylmethyl 3,4-epoxy-6-methylcyclohexane carboxylate and heating at 175° C. for 30 minutes.

EXAMPLE XVI

Employing apparatus and procedures similar to those described in Example I, a blend was compounded which contained 43.0 weight percent of an ethylene/5-hydroxymethylbicyclo[2.2.1]hept - 2 - ene copolymer containing 6 weight percent polymerized 5 - hydroxymethylbicyclo-[2.2.1]hept-2-ene in the form of bicyclic units of the formula:

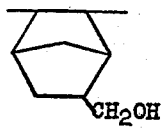

and 57.0 weight percent of an ethylene/bicyclo[2.2.1]-hept-2-ene-5,6-dicarboxylic anhydride copolymer containing 6 weight percent polymerized bicyclo[2.2.1]hept-2-ene-5,6-dicarboxylic anhydride in the form of cyclic units of the formula:

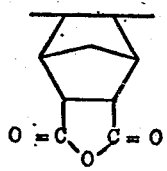

Plaques of this blend, which were molded as described in Example I, were heated at 175° C. for 30 minutes to crosslink the resin. The flow rate of the cured copolymer blend was determined at 205.4 p.s.i. at temperatures of from 170° C. to 275° C. in a Slocum grader melt Indexer. The flow rate in decigrams per minute for various temperatures is set forth in Table M.

Table M

| Temperature, ° C.: | Flow rate, dg./min. |
| --- | --- |
| 170 | 0 |
| 190 | 0.010 |
| 220 | 0.011 |
| 250 | 0.740 |
| 275 | 3.60 |
| 190 | 0.050 |
| 170 | 0.038 |

From Table M it is apparent that the crosslinking of the hydroxymethyl- and anhydride-containing copolymer blend is a reversible reaction. Thus, it is now possible to have a thermoplastic ethylene-containing polymer which has high dimensional stability at ambient temperature due to crosslinking.

EXAMPLE XVII

Employing procedures similar to those described in Example I, a blend was compounded which contained 1.5 weight percent triethylene diamine and 98.5 weight percent of a 93.2/6.8 ethylene/bicyclo[2.2.1]hept-2-ene-5,6-dicarboxylic acid anhydride copolymer. Plaques of this blend, which were compression molded as described in Example I, were heated at 175° C. for 30 minutes to crosslink the resin. The cured blend had a flow rate of 0.10 dgm./min. at 190° C. The resin was further heated and additional flow rates were taken at 220° C., 250° C., and, after cooling, again at 190° C. The flow rates are set forth in tabular form below.

| Temperature, ° C.: | Flow rate, dgm./min. |
| --- | --- |
| 190 | 0.19 |
| 220 | 0.76 |
| 250 | 2.58 |
| 190 | 0.60 |

EXAMPLE XVIII

Employing the procedures described in Example I, a blend was compounded which contained 51.5 weight percent of a 95.2/4.8 ethylene/bicyclo[2.2.1]hept-2-ene-5,6-dicarboxylic acid anhydride copolymer and 48.5 weight percent of a 97/3.0 ethylene/bicyclo[2.2.1]helpt-2-ene-5-methylol copolymer. Plaques of this blend, which were compression molded as described in Example I, were heated at 175° C. for 30 minutes to produce a crosslinked resin having a melt index of 0 dgm./min., a tensile strength of 2626 p.s.i., an ultimate elongation of 730 percent and a stiffness modulus of 25,460 p.s.i. An uncured sample of the blend was fabricated into plastic pipe having a good appearance using a 1-inch extruder, the cylinder of which was heated to 260° C. and the die of which was heated to 280° C. After cooling, the properties of the extruded crosslinked blend were: melt index of 0.006 dgm./min., tensile strength of 2342 p.s.i., ultimate elongation of 1100 percent and stiffness modulus of 30,750 p.s.i. A sample of the pipe which was immersed in refluxing water-saturated toluene for four hours swelled but did not dissolve and was found to have absorbed 43 weight percent, based on the weight of the sample, of toluene. Conventional polyethylene pipe dissolves under these conditions.

What is claimed is:
1. The heat-curable composition of a copolymer of ethylene and a substituted bicyclo[2.2.1]hept-2-ene of the formula:

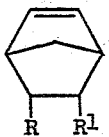

wherein R, when taken alone, is a member selected from the group consisting of a hydrogen atom and an $R^1$ radical; $R^1$, when taken alone, is a —$C_nH_{2n}Z$ radical; $n$ is an integer having a value of from 0 to 5; Z is a member selected from the group consisting of a hydroxyl radical, a carboxyl radical; a carbonylchloride radical, an isocyanato radical, a chloroformate radical, an

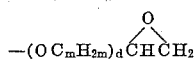

radical, and an —$NHR^2$ radical; $m$ is an integer having a value of from 1 to 5; $d$ is an integer having a value of from 0 to 1; $R^2$ is a member selected from the group consisting of a hydrogen atom and an alkyl radical of from 1 to 5 carbon atoms; and R and $R^1$, when taken together, form a divalent dicarboxylic anhydride radical, said substituted bicyclo[2.2.1]hept-2-ene being polymerized in the copolymer chain in the form of bicyclic units of the formula:

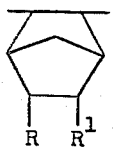

in admixture with a crosslinking amount of a crosslinking agent, with the proviso that (a) when Z is a hydroxyl radical said crosslinking agent is a polyfunctional organic compound having at least two reactive sites in the form of at least one radical selected from the class consisting of a vicinal epoxy radical, an isocyanato radical, a carboxyl, radical, a carbonyl chloride radical, a dicarboxylic acid anhydride radical, a sulfo radical (—$SO_3H$), and a sulfonyl chloride radical; with the further proviso that (b) when Z is a carboxyl radical, said crosslinking agent is a member selected from the group consisting of a metal oxide wherein the metal is present in a valence state of at least two and a polyfunctional organic compound having at least two reactive sites in the form of at least one radical selected from the class consisting of a vicinal epoxy radical, a hydroxyl radical, and an isocyanato radical; with the further proviso that (c) when R and $R^1$ form a divalent dicarboxylic anhydride group, said crosslinking agent is a member selected from the group consisting of a metal oxide wherein the metal is present in a valence state of at least two and a polyfunctional organic compound having at least two reactive sites in the form of at least one radical selected from the class consisting of an amino radical, an imino radical, a hydroxyl radical, and a phenolic hydroxyl radical; with the further proviso that (d) when Z is a carbonyl chloride group, said crosslinking agent is selected from the group consisting of a metal oxide wherein the metal is present in a valence state of at least two and a polyfunctional organic compound having at least two reactive sites in the form of at least one radical selected from the class consisting of a vicinal epoxy radical, an amino radical, an imino radical, a hydroxyl radical, and a phenolic hydroxyl radical; with the further proviso that (e) when Z is a chloroformate group, said crosslinking agent is a polyfunctional organic compound having at least two reactive sites in the form of at least one radical selected from the class consisting of a hydroxyl radical, a phenolic hydroxyl radical, an amino radical, and an imino radical; with the further proviso that (f) when Z is an —$NHR^2$ group, said crosslinking agent is a polyfunctional organic compound having at least two reactive sites in the form of at least one radical selected from the class consisting of a dicarboxylic acid anhydride radical, a carbonyl chloride radical, an isocyanato radical, and a vicinal epoxide radical; with the further proviso that (g) when Z is an isocyanato radical, said crosslinking agent is a polyfunctional organic compound having at least two reactive sites in the form of at least one radical selected from the class consisting of a hydroxyl radical, a carboxyl radical, a dicarboxylic acid anhydride radical, a carbonyl chloride radical, an amino radical, and an imino radical; and with the further proviso that (h) when Z is an

group, said crosslinking agent is a polyfunctional organic compound having at least two reactive sites in the form of at least one radical selected from the class consisting of a hydroxyl radical, a carboxyl radical, a dicarboxylic acid anhydride radical, an amino radical, and an imino group.

2. The cured composition of claim 1.

3. The heat-curable composition as claimed in claim 1 wherein said substituted bicyclo[2.2.1]hept-2-ene is of the formula:

wherein $n$ is an integer having a value of from 0 to 5, said substituted bicyclo[2.2.1]hept-2-ene being polymerized in the copolymer chain in the form of bicyclic units of the formula:

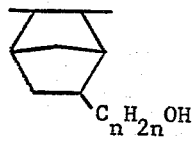

and said crosslinking agent is an organic polyisocyanate.

4. The cured composition of claim 3.

5. The heat-curable composition as claimed in claim 3 wherein said substituted bicyclo[2.2.1]hept-2-ene is 5-hydroxymethylbicyclo[2.2.1]hept-2-ene which is polymerized in the form of bicyclic units of the formula:

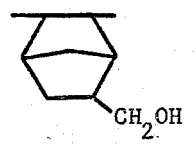

and said organic polyisocyanate is 3,3'-dimethyl-4,4'-biphenylene diisocyanate.

6. The cured composition of claim 5.

7. The heat-curable composition as claimed in claim 1 wherein said substituted bicyclo[2.2.1]hept-2-ene is of the formula:

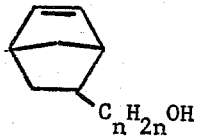

wherein $n$ is an integer having a value of from 0 to 5, said substituted bicyclo[2.2.1]hept-2-ene being polymerized in the copolymer chains in the form of bicyclic units of the formula:

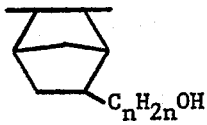

and said crosslinking agent is a vicinal epoxide-containing compound.

8. The cured composition of claim 7.

9. The heat-curable composition as claimed in claim 7 wherein said substituted bicyclo[2.2.1]hept-2-ene is 5-hydroxymethylbicyclo[2.2.1]hept-2-ene which is polymerized in the form of bicyclic units of the formula:

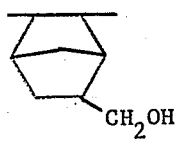

and said vicinal epoxide-containing compound is 3,4-epoxy-6-methylcyclohexylmethyl 3,4-epoxy-6-methylcyclohexane carboxylate.

10. The cured composition of claim 9.

11. The heat-curable composition as claimed in claim 1 wherein said substituted bicyclo[2.2.1]hept-2-ene is of the formula:

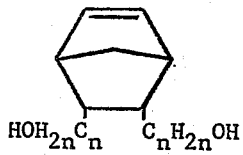

wherein $n$ is an integer having a value of from 0 to 5, said substituted bicyclo[2.2.1]hept-2-ene being polymerized in the copolymer chains in the form of bicyclic units of the formula:

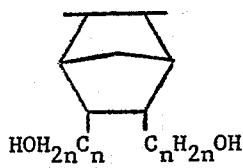

and said crosslinking agent is a dicarboxylic acid anhydride.

12. The cured composition of claim 11.

13. The heat-curable composition as claimed in claim 12 wherein said substituted bicyclo[2.2.1]hept-2-ene is 5,6-bis(hydroxymethyl)bicyclo[2.2.1]hept-2-ene which is polymerized in the copolymer chains in the form of bicyclic units of the formula:

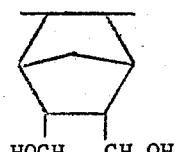

and said dicarboxylic acid anhydride is the methyl adduct of endo-bis-bicyclo[2.2.1]hept-2-ene-5,6-dicarboxylic anhydride.

14. The cured composition of claim 13.

15. The heat-curable composition as claimed in claim 11 wherein said substituted bicyclo[2.2.1]hept-2-ene is 5,6-bis(hydroxymethyl)bicyclo[2.2.1]hept-2-ene which is polymerized in the copolymer chains in the form of bicyclic units of the formula:

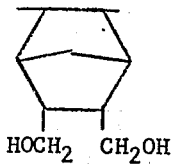

and said dicarboxylic acid anhydride is 1,2,3,4-tetrahydrophthalic anhydride.

16. The cured composition of claim 15.

17. The heat-curable composition as claimed in claim 1 wherein said substituted bicyclo[2.2.1]hept-2-ene is of the formula:

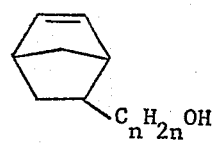

wherein $n$ is an integer having a value of from 0 to 5, said substituted bicyclo[2.2.1]hept-2-ene being polymerized in the copolymer chains in the form of bicyclic units of the formula:

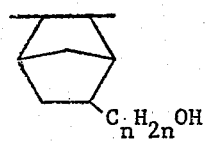

and said crosslinking agent is a copolymer of ethylene and bicyclo[2.2.1]hept-2-ene-5,6-dicarboxylic anhydride which is copolymerized in the polymer chains in the form of cyclic units of the formula:

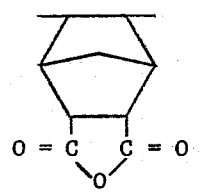

18. The cured composition of claim 17.

19. The heat-curable composition as claimed in claim 17 wherein said substituted bicyclo[2.2.1] hept-2-ene is 5-hydroxymethylbicyclo[2.2.1]hept-2-ene which is polymerized in the copolymer chains in the form of bicyclic units of the formula:

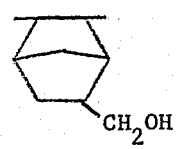

20. The cured composition of claim 19.

21. The heat-curable composition as claimed in claim 1 wherein said substituted bicyclo[2.2.1]hept-2-ene is of the formula:

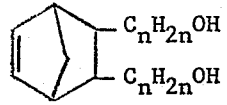

wherein $n$ is an integer having a value of from 0 to 5, said substituted bicyclo[2.2.1]hept-2-ene being polymerized in the copolymer chains in the form of bicyclic units of the formula:

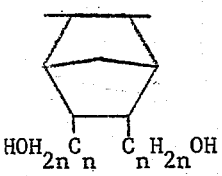

and said crosslinking agent is a copolymer of ethylene and bicyclo[2.2.1]hept-2-ene-5,6-dicarboxylic anhydride which is copolymerized in the polymer chains in the form of cyclic units of the formula:

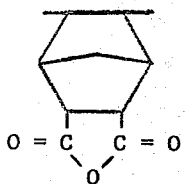

22. The cured composition of claim 21.
23. The heat-curable composition as claimed in claim 21 wherein said substituted bicyclo[2.2.1]hept-2-ene is 5,6-bis(hydroxymethyl)bicyclo[2.2.1]hept-2-ene which is polymerized in the copolymer chains in the form of bicyclic units of the formula:

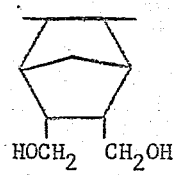

24. The cured composition of claim 23.
25. The heat-curable composition as claimed in claim 1 wherein said substituted bicyclo[2.2.1]hept-2-ene is of the formula:

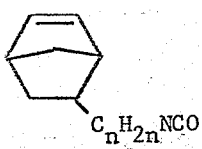

where $n$ is an integer having a value of from 0 to 5, wherein said substituted bicyclo[2.2.1]hept-2-ene has polymerized in the copolymer chains in the form of bicyclic units of the formula:

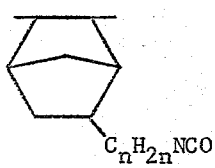

and said crosslinking agent is a polyol.
26. The cured composition of claim 25.
27. The heat-curable composition as claimed in claim 25 wherein said substituted bicyclo[2.2.1]hept-2-ene is 5-isocyanatomethylbicyclo[2.2.1]hept-2-ene which is copolymerized in the copolymer chains in the form of bicyclic units of the formula:

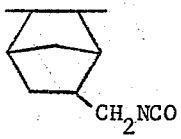

and said polyol is 2,2-bis(4-hydroxyphenyl)propane.

28. The cured composition of claim 27.
29. The heat-curable composition as claimed in claim 1 wherein said substituted bicyclo[2.2.1]hept-2-ene is of the formula:

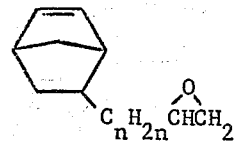

wherein $n$ is an integer having a value of from 0 to 5, said substituted bicyclo[2.2.1]hept-2-ene being polymerized in the copolymer chains in the form of bicyclic units of the formula:

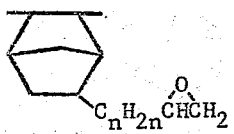

and said crosslinking agent is a dicarboxylic acid anhydride.
30. The cured composition of claim 29.
31. The heat-curable composition as claimed in claim 29 wherein said substituted bicyclo[2.2.1]hept-2-ene is 5-epoxyethylbicyclo[2.2.1]hept-2-ene which is polymerized in the copolymer chains in the form of bicyclic units of the formula:

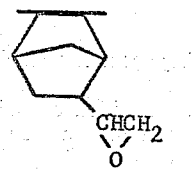

and said dicarboxylic acid anhydride is tetrahydrophthalic anhydride.
32. The cured composition of claim 31.
33. The heat-curable composition as claimed in claim 1 wherein said substituted bicyclo[2.2.1]hept-2-ene is of the formula:

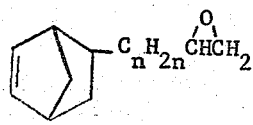

wherein $n$ is an integer having a value of from 0 to 5, wherein said substituted bicyclo[2.2.1]hept-2-ene is polymerized in the copolymer chains in the form of bicyclic units of the formula:

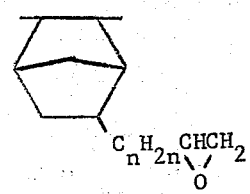

and said crosslinking agent is a catalyst for opening the epoxide ring.
34. The cured composition of claim 33.
35. The heat-curable composition as claimed in claim 33 wherein said substituted bicyclo[2.2.1]hept-2-ene is 5-epoxyethylbicyclo[2.2.1]hept-2-ene which is polymerized in the copolymer chains in the form of bicyclic units of the formula:

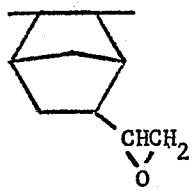

and said catalyst is stannous octoate.

36. The cured composition of claim 35.
37. The heat-curable composition as claimed in claim 1 wherein said substituted bicyclo[2.2.1]hept-2-ene is of the formula:

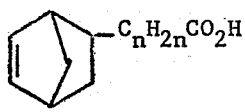

wherein $n$ is an integer having a value of from 0 to 5, wherein said substituted bicyclo[2.2.1]hept-2-ene is polymerized in the copolymer chains in the form of bicyclic units of the formula:

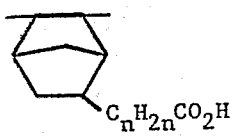

and said crosslinking agent is a vincinal epoxide-containing compound.

38. The cured composition of claim 37.
39. The heat-curable composition as claimed in claim 37 wherein said substituted bicyclo[2.2.1]hept-2-ene is 5-carboxybicyclo[2.2.1]hept-2-ene which is polymerized in the copolymer chains in the form of bicyclic units of the formula:

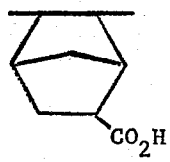

and said vicinal epoxide-containing compound is 3,4-epoxy-6-methylcyclohexylmethyl 3,4-epoxy-6-methylcyclohexane carboxylate.

40. The cured composition of claim 39.
41. The heat-curable composition as claimed in claim 1 wherein said substituted bicyclo[2.2.1]hept-2-ene is bicyclo[2.2.1]hept-2-ene-5,6-dicarboxylic anhydride which is polymerized in the copolymer chains in the form of cyclic units of the formula:

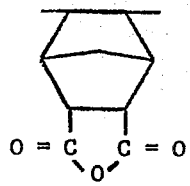

and said crosslinking agent is an organic polyamine.

42. The cured composition of claim 41.
43. The heat-curable composition of claim 41 wherein said polyamine is trimethylenediamine.
44. The cured composition of claim 43.
45. The heat-curable composition as claimed in claim 1 wherein said substituted bicyclo[2.2.1]hept-2-ene is bicyclo[2.2.1]hept-2-ene-5,6-dicarboxylic anhydride which is polymerized in the copolymer chains in the form of cyclic units of the formula:

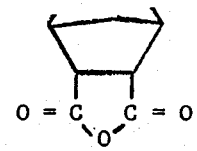

and said cross-linking agent is a polyol.

46. The cured composition of claim 45.
47. The heat-curable composition as claimed in claim 1 wherein said substituted bicyclo[2.2.1]hept-2-ene is bicyclo[2.2.1]hept-2-ene-5,6-dicarboxylic anhydride which is polymerized in the copolymer chains in the form of cyclic units of the formula:

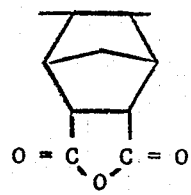

and said crosslinking agent is a vicinal epoxide-containing compound.

48. The cured composition of claim 47.
49. The heat-curable composition of claim 47 wherein said vicinal epoxide is a copolymer of ethylene and 5-epoxyethylbicyclo[2.2.1]hept-2-ene.
50. The cured composition of claim 49.
51. The reversibly-crosslinkable composition as claimed in claim 1 wherein said substituted bicyclo[2.2.1]hept-2-ene is bicyclo[2.2.1]hept-2-ene-5,6-dicarboxylic anhydride which is polymerized in the copolymer chain in the form of cyclic units of the formula:

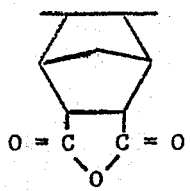

and said crosslinking agent is a compound of the formula:

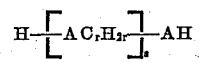

wherein A is a member selected from the group consisting of —O— and —NH—; $r$ is an integer having a value of from 2 to 10; and $s$ is an integer having a value of from 1 to 10; the ratio of hydroxyl and amino groups of said crosslinking agent to anhydride groups of said copolymer in said composiiton being not greater than 1.

52. The reversibly-crosslinked composition of claim 51.
53. The reversibly-crosslinked composition as claimed in claim 1 wherein said substituted bicyclo[2.2.1]hept-2-ene is bicyclo[2.2.1]hept-2-ene-5,6-dicarboxylic anhydride which is polymerized in the copolymer chain in the form of cyclic units of the formula:

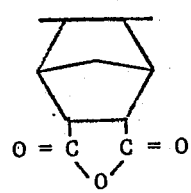

and said crosslinking agent is a copolymer of ethylene and a substituted bicyclo[2.2.1]hept-2-ene of the formula:

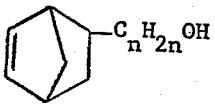

wherein $n$ is an integer having a value of from 0 to 5, said substituted bicyclo[2.2.1]hept-2-ene being polymerized in the copolymer chain in the form of bicyclic units of the formula:

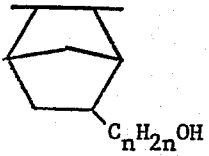

the ratio of hydroxyl groups in said crosslinking agent to anhydride groups in said ethylene/bicyclo[2.2.1]hept-2-ene-5,6-dicarboxylic anhydride copolymer in said composition being not greater than 1.

54. The reversibly-crosslinked composition of claim 53.

55. The reversibly crosslinkable composition as claimed in claim 51 wherein said compound of the formula

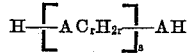

is trimethylene diamine.

56. The reversibly crosslinked composition of claim 55.

References Cited by the Examiner

UNITED STATES PATENTS 3,098,835  7/1963  Gaylord _____ 260—80.5
3,162,698  12/1964  Baum _____ 260—897

MURRAY TILLMAN, *Primary Examiner.*

E. J. TROJNAR, *Examiner.*

P. LIEBERMAN, *Assistant Examiner.*